(12) United States Patent
Putnam

(10) Patent No.: US 7,717,229 B2
(45) Date of Patent: May 18, 2010

(54) GAS TURBINE EXHAUST SOUND SUPPRESSOR AND ASSOCIATED METHODS

(75) Inventor: Robert A. Putnam, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 68 days.

(21) Appl. No.: 12/117,986

(22) Filed: May 9, 2008

(65) Prior Publication Data

US 2009/0277714 A1    Nov. 12, 2009

(51) Int. Cl.
*B64F 1/26* (2006.01)
*F01N 1/08* (2006.01)
*F02K 1/00* (2006.01)
*F01N 1/00* (2006.01)

(52) U.S. Cl. .................. 181/213; 181/218; 181/270; 181/203

(58) Field of Classification Search ............ 181/213, 181/210, 217, 218, 219, 224, 225, 226, 258, 181/270, 281, 222, 203; 244/114 B, 1 N
See application file for complete search history.

(56) References Cited

U.S. PATENT DOCUMENTS

| | | | | |
|---|---|---|---|---|
| 1,474,115 | A | * | 11/1923 | Heather ............... 181/281 |
| 2,651,381 | A | * | 9/1953 | Cooper ............... 181/281 |
| 2,692,024 | A | * | 10/1954 | Burdett, Jr. et al. ....... 181/221 |
| 2,723,723 | A | * | 11/1955 | Halliday et al. ........... 181/281 |
| 2,844,001 | A | * | 7/1958 | Alford ............... 138/40 |
| 3,092,206 | A | * | 6/1963 | Moreau ............... 181/270 |
| 3,120,877 | A | * | 2/1964 | Morris et al. ........... 181/217 |
| 3,159,238 | A | * | 12/1964 | Shearer ............... 181/213 |
| 3,454,128 | A | * | 7/1969 | Nopper ............... 181/224 |
| 3,666,044 | A | * | 5/1972 | Killian ............... 181/219 |
| 3,811,531 | A | * | 5/1974 | Forssman ............... 181/258 |
| 3,895,686 | A | * | 7/1975 | Savkar et al. ........... 181/224 |
| 4,116,269 | A | * | 9/1978 | Ikeda ............... 165/126 |
| 4,167,986 | A | * | 9/1979 | Conway ............... 181/224 |
| 4,168,763 | A | * | 9/1979 | White et al. ........... 181/218 |
| 4,244,441 | A | | 1/1981 | Tolman ............... 181/213 |
| 4,336,863 | A | * | 6/1982 | Satomi ............... 181/224 |
| 4,362,223 | A | * | 12/1982 | Meier ............... 181/206 |

(Continued)

FOREIGN PATENT DOCUMENTS

JP          61038113  A  *  2/1986

OTHER PUBLICATIONS

"Gas Turbine Systems", Northeast Controls Incorporated, 2 pages, 1995-2007 Northeast Controls Incorporated, available at www.nciweb.net/gas1.htm.

(Continued)

*Primary Examiner*—Edgardo San Martin

(57) ABSTRACT

The gas turbine exhaust sound suppressor, or exhaust silencer, and method are for a gas turbine and reduce low frequency exhaust flow noise while avoiding the creation of additional acoustical standing waves, e.g. from wake shedding at certain predictable frequencies. A plurality of elongated flow obstruction members, e.g. pipes or airfoils, extend within the exhaust passage to reduce acoustic waves within the exhaust flow, and at least some of the elongated flow obstruction members have different widths. Each of the elongated flow obstruction members is positioned at a respective angle within a predetermined angular range transverse to the flow direction, with the predetermined angular range being greater than or equal to 10 degrees from normal to the flow direction.

23 Claims, 2 Drawing Sheets

U.S. PATENT DOCUMENTS

| | | | |
|---|---|---|---|
| RE31,275 E * | 6/1983 | Wirt | 181/224 |
| 5,313,803 A * | 5/1994 | Detzer | 62/89 |
| 5,325,661 A * | 7/1994 | Rice | 60/204 |
| 5,332,872 A * | 7/1994 | Ewanek | 181/224 |
| 5,340,054 A * | 8/1994 | Smith et al. | 244/1 N |
| 5,473,123 A * | 12/1995 | Yazici et al. | 181/224 |
| 5,663,536 A * | 9/1997 | Kaplan | 181/224 |
| 5,699,981 A * | 12/1997 | McGrath et al. | 244/1 N |
| 6,035,964 A | 3/2000 | Lange | 181/224 |
| 6,092,621 A * | 7/2000 | Kinzie | 181/218 |
| 6,145,616 A * | 11/2000 | Ewanek | 181/224 |
| 6,564,901 B2 * | 5/2003 | Woods | 181/235 |
| 6,945,355 B2 * | 9/2005 | Ludwig et al. | 181/224 |
| 7,086,498 B2 * | 8/2006 | Choi et al. | 181/270 |
| 7,350,620 B2 * | 4/2008 | Lalonde | 181/270 |
| 7,516,815 B2 * | 4/2009 | Rose et al. | 181/224 |
| 2003/0136101 A1 | 7/2003 | Nishimura et al. | 60/39.5 |
| 2005/0160740 A1 | 7/2005 | Nakano et al. | 60/796 |

OTHER PUBLICATIONS

"Silencers and Sound Attenuators for Industrial Noise and Sound Control by Art USA", Art USA Industries, Inc., 4 pages, 2007 Art USA Industries, Inc., available at www.artusaindustries.us/silencers_sound_attenuators.html.

"Universal Silencer Supplies Emissions/Noise Control Solutions for Engines", Universal Silencer, Inc., 1 page, Aug. 7, 2003, available at www.power-technology.com/contractors/noise/universal/press1.html.

"Exhaust Systems", ATCO Group, ATCO Noise Management, Higgott-Kane Division, 2 pages, Feb. 2008, ATCO Group, available at www.higg-kane-atco.com/products_exhaust_read_more.htm.

* cited by examiner

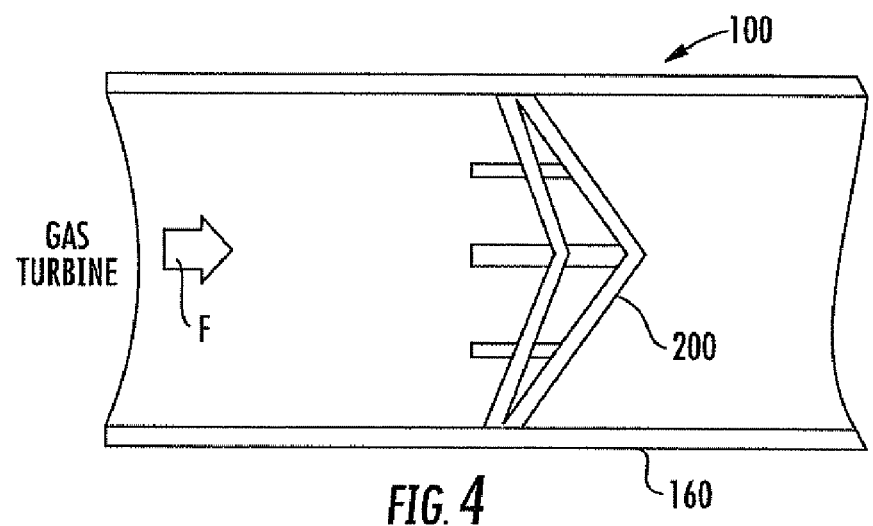
FIG. 4
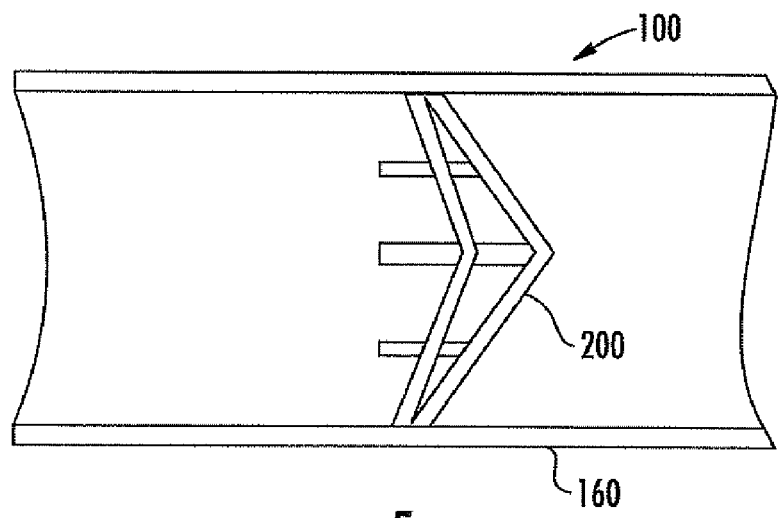
FIG. 5
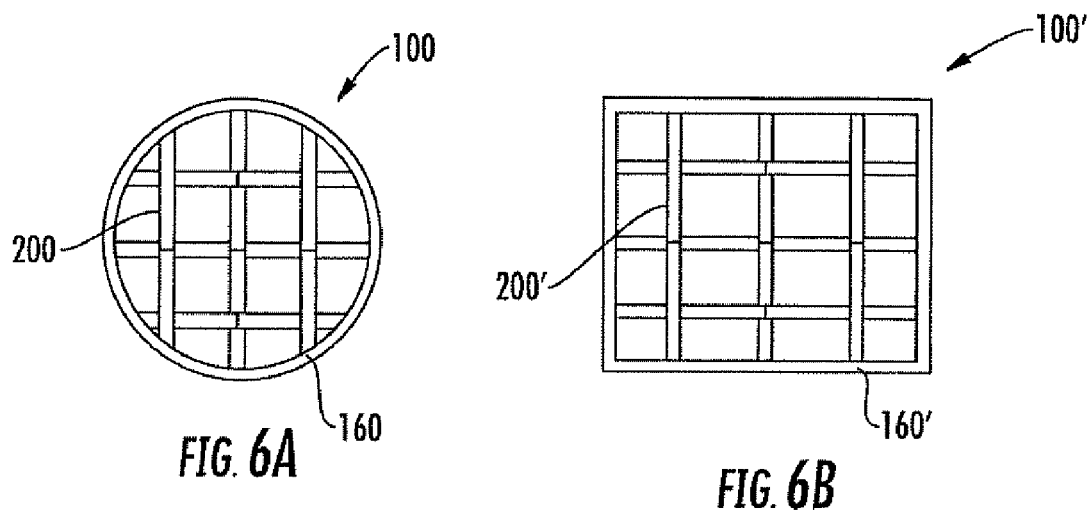
FIG. 6A
FIG. 6B

GAS TURBINE EXHAUST SOUND SUPPRESSOR AND ASSOCIATED METHODS

FIELD OF THE INVENTION

The present invention relates to the field of gas turbines, and, more particularly, to exhaust silencers or noise suppression in gas turbines and related methods.

BACKGROUND OF THE INVENTION

A gas turbine engine includes a compression section, a combustion section, and a turbine section. A flow path for the gases extends axially through the engine. The compression section has a rotor assembly that includes an array of rotor blades that are angled with respect to the approaching gas flow. The compression section also has a stator assembly that includes an array of stator vanes. Duct walls extend circumferentially with respect to the flow path to form the boundaries for the working medium gases in the fan section.

As the rotor assembly rotates, the blades increase the pressure of the gases. The rotor blades also increase the velocity of the gases and direct the flow of gases from the engine axial direction to the blade rotation direction. The gases are then flowed past the rotor blade array to the stator vane cascade, which redirects the flow of gases to the axial direction. By reorienting the flow in this manner, the stator vane cascade increases the recovery of the flow energy of the gases into thrust.

As the working medium gases travel along the engine flow path, the gases are pressurized in the rotating compression section, which causes the gas temperature to rise. The hot, pressurized gases are burned with fuel in the combustion section to add energy to the gases. The gases are then expanded through the rotating turbine section to produce useful work and for pressurizing the gases in the fan and compression sections.

The gas flow through the engine generates acoustic energy or noise. The main sources of noise in a gas turbine engine exhaust are combustion noise, turbulent noise, and fan noise. Combustion noise originates within the combustion chamber of the gas turbine. Turbulent noise includes all the dynamic instabilities resulting from the high velocity exhaust stream such as the jet noise resulting from the localized flow separation at boundary discontinuities, or periodic high velocity flow impact on exhaust duct structural boundaries. Fan noise results from the periodic passage of the individual turbine blades which creates pressure pulsations that propagate downstream in the exhaust duct in the same way that inlet fan noise is generated and propagates out the gas turbine inlet.

U.S. Pat. No. 4,244,441 to Tolmon describes a broad band acoustic attenuator for attenuating gas turbine engine noise using a plurality of axially extending, open-ended, perforated cylinders concentrically arranged within the exhaust duct of the gas turbine engine for attenuating noise therefrom without imposing significant back pressure penalties.

U.S. Pat. No. 6,035,964 to Lange describes a combined device for positioning between the outlet of a gas turbine and a steam generator. The combined device acts as a sound-absorber and as a diffuser and is designated a gas turbine muffler. The gas turbine muffler has an inner zone, which widens out in the flow direction at a relatively large angle. Deflector elements arranged in this inner zone delineate diffuser channels that are located between adjacent deflector elements. The diffuser channels widen out in each case at a significantly smaller acute angle of less than seven degrees. In addition to decelerating the stream of gas and hence, in addition, increasing the pressure, the narrow diffuser channels also bring about sound-absorption by reducing the regions of turbulence, making the stream more uniform, and aligning the stream.

The silencing of gas turbine installations in industrial environments may include attenuating the noise from the atmospheric inlet and the exhaust openings. The sound from the gas turbine enclosure, auxiliaries, and driven equipment also may be considered in the silencing approach. Some degree of attenuation can be attained by natural factors, such as divergence, directivity, air absorption, and duct configurations. Further sound control, however, is typically obtained through the use of adequate silencer or sound suppressor.

A sound suppressor normally contains one or more passages which are lined with sound absorbing material, incorporated in structures that protect them from erosion from air flow. To attenuate low frequency sounds, thick baffles widely spaced are typically used; whereas for high frequency sounds, sound absorption is obtained by using thin baffles closely spaced. Increased attenuation may be achieved by incorporating bends or elbows into the sound suppressor.

Some conventional exhaust sound suppressors address attenuation of low frequency noise by attempting to disrupt in-duct acoustical standing waves by using pipes installed normal to the flow direction, or plates installed parallel to the flow direction. However, these approaches may introduce flow effects, e.g. wake shedding, that cause additional acoustical standing waves where none had existed before.

SUMMARY OF THE INVENTION

In view of the foregoing background, it is therefore an object of the present invention to provide an exhaust sound suppressor and method for a gas turbine that reduces low frequency exhaust flow noise while avoiding the creation of additional acoustical standing waves, e.g. from wake shedding at certain predictable frequencies or from standing acoustical waves at certain predictable frequencies referred to as duct modes.

This and other objects, features, and advantages in accordance with the present invention are provided by a gas turbine exhaust sound suppressor system including an exhaust duct including an inlet to receive an exhaust flow from a gas turbine and defining an exhaust passage having a flow direction. A plurality of elongated flow obstruction members, e.g. pipes or airfoils, extend within the exhaust passage to reduce acoustic waves within the exhaust flow, at least some of the elongated flow obstruction members having different widths. Each of the elongated flow obstruction members may be positioned at a respective angle within a predetermined angular range transverse to the flow direction, with the predetermined angular range being greater than or equal to 10 degrees from normal to the flow direction, for example.

The predetermined angular range may be less than or equal to 30 degrees from normal to the flow direction. Furthermore, at least some of the elongated flow obstruction members may be longitudinally spaced apart within the exhaust duct. Also, wider elongated flow obstruction members may be positioned further downstream in the exhaust duct than thinner elongated flow obstruction members.

The plurality of elongated flow obstruction members may be configured to reduce acoustical standing waves in a range of 16-20 Hz. The widths of the plurality of elongated flow obstruction members may be between four to six inches. The plurality of elongated flow obstruction members may extend across the exhaust duct and be connected to interior portions thereof.

A method aspect is directed to suppressing sound in an exhaust flow from a gas turbine having an exhaust duct defining an exhaust passage and a flow direction. The method may include providing a plurality of elongated flow obstruction members, e.g. pipes or airfoils, at least some of which have different widths, and positioning each of the elongated flow obstruction members within the exhaust passage at a respective angle within a predetermined angular range transverse to the flow direction to reduce acoustic waves within the exhaust flow. The predetermined angular range may be greater than or equal to 10 degrees from normal to the flow direction.

Also, the predetermined angular range may be less than or equal to 30 degrees from normal to the flow direction. Positioning may include at least some of the elongated flow obstruction members being longitudinally spaced apart within the exhaust duct, and may further include positioning wider elongated flow obstruction members further downstream in the exhaust duct than thinner elongated flow obstruction members.

The plurality of elongated flow obstruction members may be configured to reduce acoustical standing waves in a range of 16-20 Hz. Providing may include randomly selecting the widths of the plurality of elongated flow obstruction members to, be between four to six inches. Positioning may also include connecting the plurality of elongated flow obstruction members across the exhaust duct and to interior portions thereof.

BRIEF DESCRIPTION OF THE DRAWINGS

FIG. 4 is a side partial sectional view illustrating another embodiment of an exhaust sound suppressor for a gas turbine.

FIG. 5 is a top partial sectional view illustrating the exhaust sound suppressor of FIG. 4.

FIGS. 6A and 6B are cross-sectional views of embodiments of the exhaust sound suppressor of FIG. 4 taken along line B-B.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments. The dimensions of layers and regions may be exaggerated in the figures for clarity.

As discussed above, the turbulent high energy exhaust flow from a gas turbine contains and may generate high levels of low frequency sound, e.g. less than 100 Hz. Some proportion of such low frequency sound is contained in the exhaust flow at the gas turbine exit and some is generated within and by virtue of the turbulent exhaust flow as it passes through the exhaust manifold and associated exhaust processing elements located in the downstream exhaust duct.

Conventional approaches include slowing the exhaust flow down via expansion of the exhaust passage to reduce the generation of low frequency energy, or the use of thick absorptive baffles in the exhaust flow path designed to attenuate low frequency energy already generated. Combined cycle heat recovery steam generation (HRSG) transition areas may have included plates and flow straighteners parallel to the flow direction. Also, pipes may have been installed normal to the flow direction. Although these approaches may reduce existing acoustical standing waves, they also may introduce certain flow effects, e.g. wake shedding, that cause additional acoustical standing waves where none had existed before.

Figure 1:
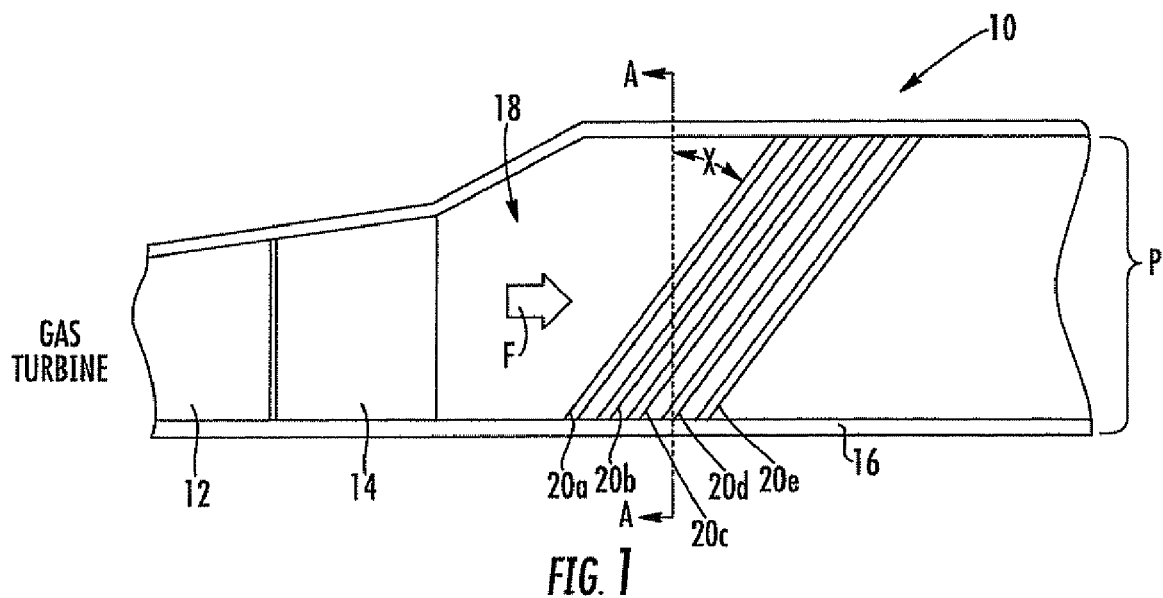
FIG. 1 is a side partial sectional view illustrating an exhaust sound suppressor for a gas turbine in accordance with the present invention.
Figure 2:
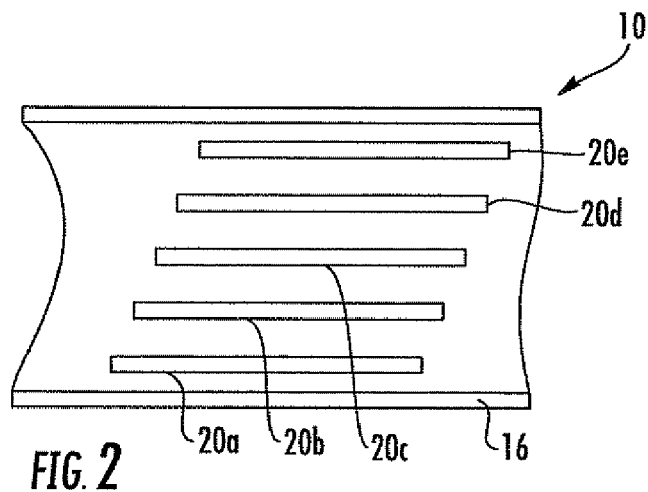
FIG. 2 is a top partial sectional view, illustrating the exhaust sound suppressor of FIG. 1.

Referring initially to FIGS. 1 and 2, an exhaust sound suppressor 10 and method for a gas turbine 12 will now be described. An object of the exhaust sound suppressor 10 and associated method is to reduce low frequency exhaust flow noise while avoiding the creation of additional acoustical standing waves, e.g. from wake shedding at certain predictable frequencies.

There are two major categories of dynamic pressure fluctuations in gas turbine exhaust streams. The acoustic sound field generated by the gas turbine's turbine blading and jet noise from flow separation at various discontinuities constitutes one major category. The second includes convected turbulence generated by the velocity gradients within the exhaust stream and by virtue of the fact that gas turbine exhaust velocity vectors have a transverse component normal to the gas turbine axis. The first of these, the acoustic waves, move at the speed of sound through the exhaust gas and are also convected by the moving exhaust flow stream. The second of these, the turbulent flow, simply moves with and is a part of, the convected exhaust flow stream. It is customary when measuring in-duct sound pressure levels to consider only the acoustic sound field and to discount the contribution of convected turbulence. However, there are ways in which the convected turbulence can and does contribute to the total effective sound emissions measurable at far field receivers, especially at low frequencies.

First, convected flow turbulence can serve as the dynamic driver for certain 'organ pipe' resonances in the exhaust stack system, referring to the manner in which a fundamental organ pipe (or trumpet or clarinet) note is established. Second, the effect of convected turbulence in imposing periodic fluctuations in the form of turbulent eddies may amplify certain otherwise benign acoustical excitations so as to become significant low frequency periodicities, measurable at far field receivers.

An object of the present approach is to reduce both these turbulent mechanisms' influence on the total sound emissions by reducing the scale of all turbulence thereby disrupting, and so reducing, the potential for amplification into low frequency emissions. In addition, the approach includes provisions to ensure that the plurality of elongated flow obstructions are arranged and sized in such a way that new resonant conditions due to wake shed vortices are not established.

The gas turbine exhaust sound suppressor system 10, or exhaust silencer, is positioned downstream from a gas turbine 12 and may include various exhaust treatment elements, such as diffuser 14, therebetween. The exhaust sound suppressor system 10 includes an exhaust duct 16 including an inlet 18 to receive an exhaust flow from the gas turbine 12. The duct 16 defines an exhaust passage P having a flow direction F.

A plurality of elongated flow obstruction members 20a-20e (hereinafter referred to collectively with the reference 20), e.g. pipes or airfoils, extend within the exhaust passage P to reduce acoustic waves within the exhaust flow. As used herein, "airfoil" refers to a body (e.g. a wing, blade, plate etc.) designed to provide a minimized drag force due to the surrounding exhaust flow. At least some of the elongated flow obstruction members 20 have different widths so that adjacent wake shed vortex sheets are unlikely to be established. For example, the characteristic width of the elongated flow obstruction members 20 may be determined randomly as will be described in greater detail below. The widths of the plurality of elongated flow obstruction members 20 may be between four to six inches, e.g. some of the elongated flow obstruction members 20 may be selected from, and include, four inch pipe, five inch pipe and six inch pipe. Such varying widths should reduce low frequency exhaust flow noise while avoiding the creation of additional acoustical standing waves.

Each of the elongated flow obstruction members 20 is canted or positioned at a respective angle X within a predetermined angular range transverse to the flow direction F. The predetermined angular range is preferably greater than or equal to 10 degrees from normal to the flow direction. The predetermined angular range may be less than or equal to 30 degrees from normal to the flow direction. Since the actual velocity vector of the exhaust flow F in a typical gas turbine exhaust may not be truly axial, for increased effectiveness, the respective angle X may be between 10-30 degrees off normal (or 60-80 degrees off axis) so that the elongated flow obstruction members 20 are not normal to or parallel with the flow direction F. Such angular ranges should reduce low frequency exhaust flow noise while avoiding the creation of additional acoustical standing waves.

At least some of the elongated flow obstruction members 20 may be longitudinally spaced apart within the exhaust duct. For example, as illustrated in FIG. 1, elongated flow obstruction member 20e is further downstream in the flow direction F than elongated flow obstruction members 20a-20d. Also, for effective frequency distribution, wider elongated flow obstruction members 20 may be positioned further downstream in the exhaust duct 16 than thinner elongated flow obstruction members.

Figure 3A:
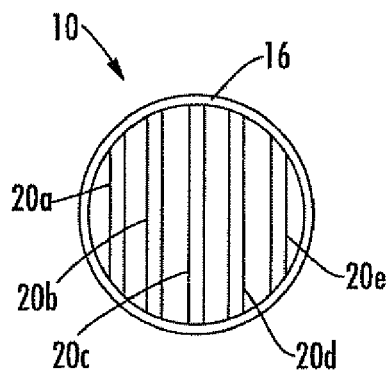
FIGS. 3A and 3B are cross-sectional views of embodiments of the exhaust sound suppressor of FIG. 1 taken along line A-A.
Figure 3B:
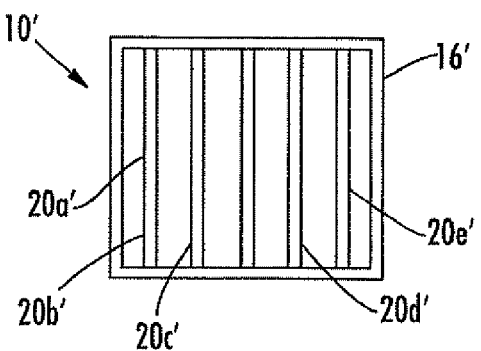

Whether the exhaust duct from a gas turbine is round or rectangular, the plurality of elongated flow obstruction members 20 may extend across the exhaust duct 16, e.g. horizontally and/or vertically, and be connected to interior portions thereof. A round exhaust duct 16 including obstruction members 20a-20e is illustrated in FIG. 3A, while a square exhaust duct 16' including obstruction members 20a'-20e' is illustrated in FIG. 3B.

Other embodiments are contemplated, for example, as illustrated in the embodiment of the exhaust sound suppressor system 100 of FIGS. 4 and 5 showing that various arrangements of the elongated flow obstruction members 200 may include grids and lattices within the exhaust duct 160. A round exhaust duct 160 including obstruction members 200 is illustrated in FIG. 6A, while a square exhaust duct 160' including obstruction members 200' is illustrated in FIG. 6B.

At least some of the elongated flow obstruction members desirably include different widths, are positioned at the respective angles as discussed above, and/or are longitudinally spaced apart within the exhaust duct 16/160, so that low frequency exhaust flow noise is reduced and additional acoustical standing waves are avoided.

For example, the plurality of elongated flow obstruction members 20/200 may be configured (i.e. sized and positioned) to reduce acoustical standing waves in a range of 16-20 Hz. Relative to a conventional absorptive exhaust sound suppressor system, a reduction of 5 dB of acoustical noise at 16 Hz may eliminate as much as 50% (e.g. 10-40 feet of duct) of the size or bulk of the exhaust duct, and this is a substantial improvement in view of the associated costs and space.

A method aspect is directed to suppressing sound in an exhaust flow from a gas turbine 12 having an exhaust duct 16 defining an exhaust passage P and a flow direction F. The method includes providing a plurality of elongated flow obstruction members 20, e.g. pipes or airfoils, at least some of which have different widths, and positioning each of the elongated flow obstruction members 20 within the exhaust passage P at a respective angle X within a predetermined angular range transverse to the flow direction F to reduce acoustic waves within the exhaust flow. The predetermined angular range is greater than or equal to 10 degrees from normal to the flow direction F.

Also, the predetermined angular range may be less than or equal to 30 degrees from normal to the flow direction F. Positioning may include at least some of the elongated flow obstruction members 20 being longitudinally spaced apart within the exhaust duct 16, and may further include positioning wider elongated flow obstruction members 20 further downstream in the exhaust duct 16 than thinner elongated flow obstruction members.

The plurality of elongated flow obstruction members 20 may be configured to reduce acoustical standing waves in a range of 16-20 Hz. Providing may include randomly selecting the widths of the plurality of elongated flow obstruction members 20 to be between four to six inches. Positioning may also include connecting the plurality of elongated flow obstruction members 20 across the exhaust duct 16 and to interior portions thereof.

With respect to the random determination or selection of the width or diameter of the elongated flow obstruction members 20, there are a variety of approaches for determining random number sequences. A set of sizes/widths for the elongated flow obstruction members 20 may be established so that primary low frequency turbulent eddies are disrupted, but wake shed vortex frequencies thereof will have a low probability of coupling with one another at some other resonant frequency.

For example, random number sequences can be established using the decimal places following the factor "Π", from random number tables or from computer generated processes. For example, the desired widths for a particular application may be, in each instance, determined according to a mathematical formula, referred to as a quadratic-residue number theory sequence, as would be appreciated by the skilled artisan. In any case, as an example, if three pipe sizes were available (e.g. four, five and six inch pipe), and a total of eight pipes were planned for a certain application, then the random number sequences may yield a set of corresponding pipes after assigning one of the three pipe sizes to each of three evenly distributed sets of available numbers within the sequence.

So, a sound suppressor system 10 or exhaust silencer and associated method is to be used in the exhaust duct 16 of a gas turbine 12 to disrupt large scale turbulent flow contributing to low frequency sound generation, to reduce the scale of such turbulence, thus increasing the characteristic frequency and reducing the low frequency content, with selection of random dimensioned elongated flow obstruction members 20 to avoid creating additional wake shed vortex frequencies.

Many modifications and other embodiments of the invention will come to the mind of one skilled in the art having the benefit of the teachings presented in the foregoing descriptions and the associated drawings. Therefore, it is understood that the invention is not to be limited to the specific embodi- That which is claimed is:

1. A gas turbine exhaust sound suppressor system comprising:
    an exhaust duct including an inlet to receive an exhaust flow from a gas turbine and defining an exhaust passage having a flow direction; and
    a plurality of elongated flow obstruction members extending within the exhaust passage to reduce acoustic waves within the exhaust flow;
    at least some of the elongated flow obstruction members having different widths;
    each of the elongated flow obstruction members being positioned at a respective angle within a predetermined angular range transverse to the flow direction;
    the predetermined angular range being greater than or equal to 10 degrees from normal to the flow direction.

2. The gas turbine exhaust sound suppressor system of claim 1, wherein the predetermined angular range is less than or equal to 30 degrees from normal to the flow direction.

3. The gas turbine exhaust sound suppressor system of claim 1, wherein at least some of the elongated flow obstruction members are longitudinally spaced apart within the exhaust duct.

4. The gas turbine exhaust sound suppressor system of claim 3, wherein wider elongated flow obstruction members are positioned further downstream in the exhaust duct than thinner elongated flow obstruction members.

5. The gas turbine exhaust sound suppressor system of claim 1, wherein the plurality of elongated flow obstruction members comprise a plurality of pipes.

6. The gas turbine exhaust sound suppressor system of claim 1, wherein the plurality of elongated flow obstruction members comprise a plurality of airfoils.

7. The gas turbine exhaust sound suppressor system of claim 1 wherein the plurality of elongated flow obstruction members are configured to reduce acoustical standing waves in a range of 16-20 Hz.

8. The gas turbine exhaust sound suppressor system of claim 1, wherein the widths of the plurality of elongated flow obstruction members are between four to six inches.

9. The gas turbine exhaust sound suppressor system of claim 1, wherein the plurality of elongated flow obstruction members extend across the exhaust duct and are connected to interior portions thereof.

10. A gas turbine exhaust sound suppressor system comprising:
    an exhaust duct including an inlet to receive an exhaust flow from a gas turbine and defining an exhaust passage having a flow direction; and
    a plurality of elongated flow obstruction members extending within the exhaust passage to reduce acoustic waves within the exhaust flow, the plurality of elongated flow obstruction members extending across the exhaust duct and being connected to interior portions thereof;
    at least some of the elongated flow obstruction members having different widths;
    each of the elongated flow obstruction members being positioned at a respective angle within a predetermined angular range of 10 to 30 degrees from normal to the flow direction.

11. The gas turbine exhaust sound suppressor system of claim 10, wherein at least some of the elongated flow obstruction members are longitudinally spaced apart within the exhaust duct.

12. The gas turbine exhaust sound suppressor system of claim 11, wherein wider elongated flow obstruction members are positioned further downstream in the exhaust duct than thinner elongated flow obstruction members.

13. The gas turbine exhaust sound suppressor system of claim 10, wherein the plurality of elongated flow obstruction members comprise at least one of a plurality of pipes and a plurality of airfoils.

14. The gas turbine exhaust sound suppressor system of claim 10, wherein the plurality of elongated flow obstruction members are configured to reduce acoustical standing waves in a range of 16-20 Hz.

15. The gas turbine exhaust sound suppressor system of claim 10, wherein the widths of the plurality of elongated flow obstruction members are between four to six inches.

16. A method of suppressing sound in an exhaust flow from a gas turbine having an exhaust duct defining an exhaust passage and a flow direction, the method comprising:
    providing a plurality of elongated flow obstruction members, at least some of the elongated flow obstruction members having different widths; and
    positioning each of the elongated flow obstruction members within the exhaust passage at a respective angle within a predetermined angular range transverse to the flow direction to reduce acoustic waves within the exhaust flow;
    the predetermined angular range being greater than or equal to 10 degrees from normal to the flow direction.

17. The method of claim 16, wherein the predetermined angular range is less than or equal to 30 degrees from normal to the flow direction.

18. The method of claim 16, wherein positioning includes at least some of the elongated flow obstruction members being longitudinally spaced apart within the exhaust duct.

19. The method of claim 18, wherein positioning further includes positioning wider elongated flow obstruction members further downstream in the exhaust duct than thinner elongated flow obstruction members.

20. The method of claim 16, wherein providing the plurality of elongated flow obstruction members comprises providing at least one of a plurality of pipes and a plurality of airfoils.

21. The method of claim 16, wherein the plurality of elongated flow obstruction members are configured to reduce acoustical standing waves in a range of 16-20 Hz.

22. The method of claim 16, wherein providing includes randomly selecting the widths of the plurality of elongated flow obstruction members to be between four to six inches.

23. The method of claim 16, wherein positioning includes connecting the plurality of elongated flow obstruction members across the exhaust duct and to interior portions thereof.

* * * * *